Aug. 23, 1966   H. K. PUHARICH ET AL   3,267,931
ELECTRICALLY STIMULATED HEARING WITH SIGNAL FEEDBACK
Filed Jan. 9, 1963
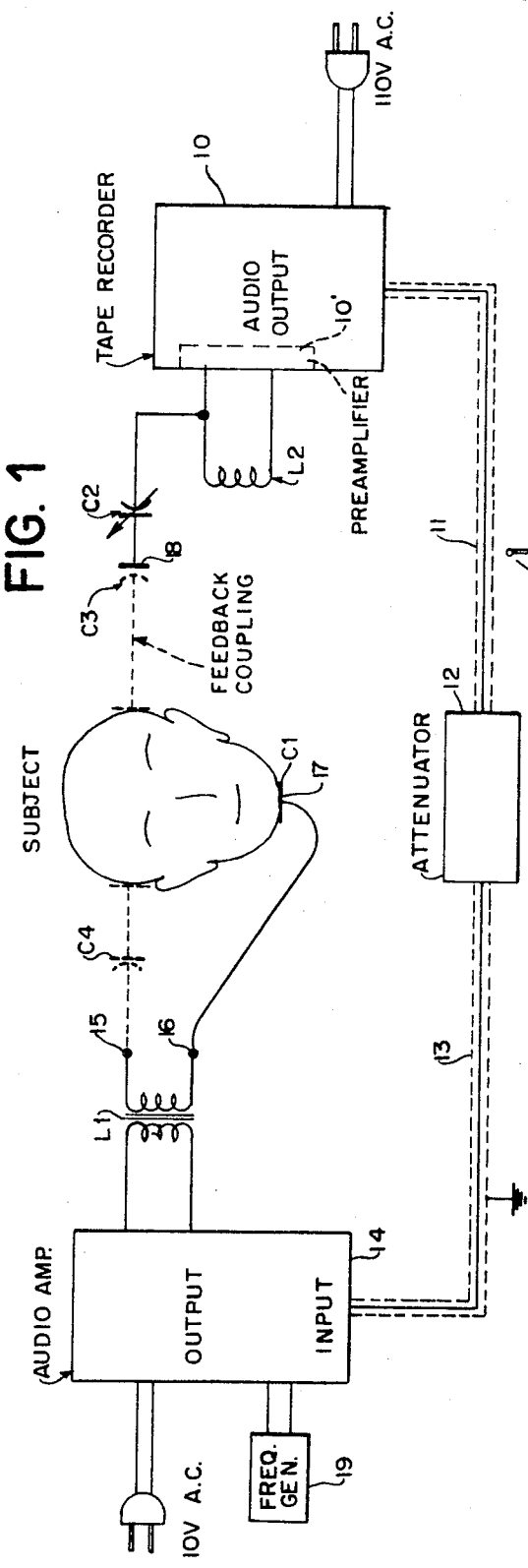
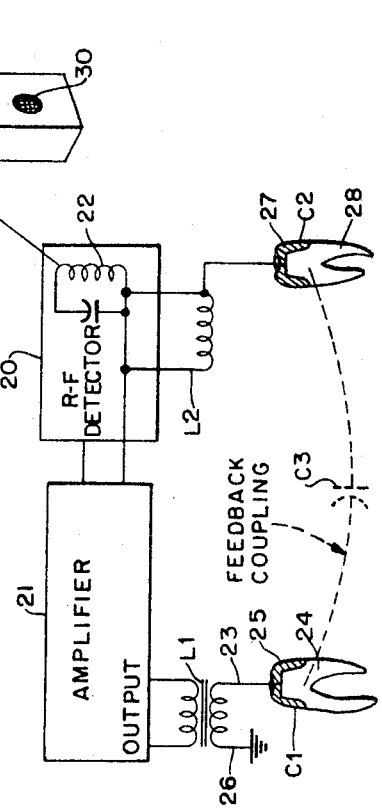
INVENTORS
HENRY K. PUHARICH
JOSEPH L. LAWRENCE
BY
ATTORNEYS

United States Patent Office 3,267,931
Patented August 23, 1966

3,267,931
ELECTRICALLY STIMULATED HEARING WITH SIGNAL FEEDBACK
Henry K. Puharich, 87 Hawkes Ave., Ossining, N.Y., and Joseph L. Lawrence, 570 Fort Washington Ave., New York, N.Y.
Filed Jan. 9, 1963, Ser. No. 250,301
7 Claims. (Cl. 128—1)

This application is a continuation-in-part of our co-pending application Serial No. 164,882, filed January 8, 1962, now U.S. Patent No. 3,170,993.

The present invention relates generally to systems for assisting hearing in a human subject through electrical stimulation of the facial nerve system, and is directed more particularly to a novel and improved electrical stimulation hearing system in which the response of the subject is increased in a significant manner by providing for the effective feedback of operative signals from the subject to the signal source.

A fundamentally new approach to artifically stimulated hearing, which forms the subject of our earlier United States Patent No. 2,995,633, involves the application of audio modulated electrical signals to the facial nerve system of a human subject. Advantageously, for technical and cosmetic reasons, the site of application of the electrical stimulation is through viable nerves serving the teeth, although the principles of the invention are applicable to the stimulation of other facial system nerves, which serve areas of the head and neck. The system of the present invention, while utilizing the principles of our above-mentioned patent, represents a significant improvement thereover as regards the ability of the subject to hear with greater clarity and accuracy, and over a greatly extended range of frequencies.

In accordance with a most significant aspect of the invention, electronic circuit means are provided, for imparting an audio modulated signal to viable nerves of the facial system, which circuit means include arrangements forming a feedback loop coupling between the body of the subject and a portion of the circuit means on the input side of an amplification stage thereof. Although the phenomenon is not fully understood, it appears that the feedback system results in the high amplification of a high-frequency carrier signal, which has the effect of rendering the subject especially responsive to the information signal, usually in the form of voice or music.

Using the system of the invention the range of frequencies perceived by a test subject, at usable levels of power input, was extended out to twenty thousand cycles per second. In contrast, without feedback coupling in accordance with the invention, ten thousand cycles per second appeared to be about the highest perceptible level without gross and undesirable increases in levels of power input. Moreover, without feedback coupling, and using conventional acoustic stimulation of hearing, the perception range of these subjects was limited to a maximum of about twelve to thirteen thousand cycles per second.

In its most advantageous embodiment, the system of the invention includes a converting unit for receiving audible sounds and converting them to corresponding modulated electrical signals. The converting unit advantageously includes a radio transmitter, which broadcasts short range to a physically separate receiving unit, which may be located within the oral cavity of the subject and in electrically coupled relation to viable nerves of the teeth. In addition, means are provided for coupling the body of the subject back to the electrical system, at some point on the input side of an amplification stage, such that a signal is fed back from the body, amplified, and again applied to the nerves of the facial system.

For a better understanding of the invention, reference should be made to the following detailed description and to the accompanying drawing, in which:

FIG. 1 is a simplified, schematic representation of an advantageous laboratory or studio circuit system for effecting electrical stimulation of hearing in a human subject, using feedback coupling in accordance with the principles of the invention; and FIG. 2 is a simplified, schematic representation of the system of FIG. 1 as modified and in the advantageous form of intra-oral system for hearing stimulation in accordance with the invention.

Referring now to the drawing, and initially to FIG. 1 thereof, the reference numeral 10 designates a controllable signal generator which, in the specific illustration, is a Webcor Model 2002 tape recorder. The recorder 10 may be of conventional design, being adapted to produce, as an output, a modulated electrical signal corresponding to signals on pre-recorded tapes. Thus, the output signals of the recorder may correspond to voice, music, pure tones or other predetermined sounds, or the output may be special predetermined wave forms, for example.

The output of the recorder 10 is connected through a cable 11, an attenuator 12, and a cable 13 to the input of a signal amplifier 14 which, in the specific illustration is an Eico Stereo Model St-70 audio amplifier. The amplifier 14 is controllably adjustable to vary the level of the signal output at the terminals 15, 16 of the amplifier output transformer $L_1$.

In accordance with the principles of the invention the output of the amplifier 14 is coupled to the nerves of the facial system of a human subject, advantageously through an insulated electrode plate 17 forming a capacitive coupling identified in FIG. 1 as $C_1$. The electrode 17 may be a small conductive plate, about the size of a penny, which is covered on its operative surface with a thin film of Mylar (polyethylene terephthalate) or similar material of desired dielectric properties. The electrode 17 is connected directly to one terminal 16 of the amplifier output transformer $L_1$, and the Mylar covered surface of the electrode is applied to one of several identifiable areas about the head and neck served by nerves of the facial system, such that the electrode 17 is capacitively coupled with the facial system nerves of the subject. The other terminal 15 of the amplifier output transformer $L_1$ of the illustrated system is not directly connected to the human subject, but is coupled to the body by an air capacitance coupling indicated diagrammatically at $C_4$. An electrode identical to 17 may be advantageously coupled to 15 and coupled capacitively to the skin at some other identifiable area of the facial nerve system. While not necessary to the operation of the system, the use of a second electrode adds increased volume to the subject's hearing.

In addition to the above described couplings, and as a key aspect of the invention, a feedback coupling is established between the subject and the input side of the amplification system, the specifically illustrated feedback coupling being made to the input of the tape recorder preamplifier 10'. As shown in FIG. 1, a coil $L_2$, which is the tape head coil connected to the grid of the first stage amplification tube of the recorder preamplifier circuit 10', is connected to a variable capacitor $C_2$. The capacitor $C_2$ is, in turn, coupled through an air capacitance coupling indicated diagrammatically at $C_3$. The capacitive coupling $C_3$ advantageously is established by providing a conductive plate 18, which is mounted in exposed relation to the human subject, being so arranged that the subject and the plate may be brought into predetermined proximity, to effect the desired coupling.

In the operation of the system illustrated in FIG. 1, a suitable input signal is imparted to the tape recorder 10, by a suitably prerecorded magnetic tape, in accordance with conventional principles. The output of the tape recorder, in the form of a modulated electrical signal, corresponding to the prerecorded input, is transmitted through the cables 11, 13 and the attenuator 12 to the input of the audio amplifier 14. The recorder output signal, controllably amplified in the amplifier 14, is developed at the output terminals 15, 16 of the amplifier output transformer $L_1$. In accordance with the invention, the output signal includes a high frequency carrier (for example, produced by a generator 19), and in the illustrated circuit arrangement a carrier frequency of 46 kc. (46,000 cycles per second) was developed.

One terminal of the output transformer $L_1$ is capacitively coupled to the facial nerve system of the subject, by means of the Mylar-covered capacitor plate electrode 17, designated also as capacitor $C_1$. The electrode is applied to any of a predetermined number of identifiable, responsive areas about the head and neck of the subject, which are served by the facial nerve system. The other terminal 15 of the output transformer $L_1$ is left unconnected, being coupled to the body of the subject by air capacitance effect.

When the subject is coupled to the output transformer $L_1$, as above described, the transmission of intelligence to the subject proves to be relatively inefficient, being characterized by distortion and difficulty of discrimination. However, when the body of the subject is brought into predetermined proximity to the conductive plate 18, to form the capacitive coupling $C_3$, a capacitively coupled feedback circuit is established to the coil $L_2$ of the tape recorder connected to the preamplifier stage of the tape recorder. Precise variation of the entire capacitive coupling, when the body is in fixed relation to the plate 18, is effected by controllable adjustment of the variable capacitor $C_2$.

Establishment of the capacitive feedback circuit, as above described, produces several remarkable effects, which are not fully understood. First, although the maximum rated output of the commercial amplifier 14 was 400 volts, peak to peak, voltages recorded between the terminals 15, 16 of the output transformer $L_1$, with the electrode 17 applied to the subject, ranged from 900 volts to 10,000 volts (R.M.S.). Second, the speech discrimination of the subject improved significantly and the sound became free of noticeable distortion. By way of example, in one test sequence, the subject was coupled to the system as illustrated in FIG. 1, with an effective, high impedance capacitive feedback coupling. The subject had excellent speech discrimination when the output voltage level, measured across the terminals 15, 16, was set at 1200 volts. Thereafter, as the subject moved away from the electrode plate 18, the voltage across the terminals 15, 16 decreased from 1200 volts to 900 volts, the subject's speech discrimination simultaneously decreasing, accompanied by an increase in distortion; continued movement of the subject away from the electrode plate 18 caused the voltage to drop below 900 volts, after which no sensation of hearing was produced in the subject. Starting again at the 1200 volt control level, the subject moved closer to the plate 18, which caused the voltage to increase, but at the same time caused the hearing sensation to decrease to nothing. By properly "tuning" the capacitive coupling by manipulation of his body, the subject can obtain a maximum volume, distortion-free hearing sensation with 100 percent speech discrimination scores.

In additional experiments, the terminal 15 was coupled to the subject, by an electrode similar to the coupling electrode 17. An increase in the "volume" of hearing sensation was realized when this was done. Moreover, when the respective electrodes were applied to selected, discrete areas of the subject served by nerves of the facial system, in certain geometrical combinations, stereophonic sound sensations were perceived by the subject.

In the modified system of FIG. 2, provisions are made for adapting the system for intra-oral placement of a receiver system, cooperating with a short range transmitter concealed on or about the body of the subject. Thus, a highly miniaturized receiver system, consisting of a radio frequency detector 20 and an amplifier 21, is properly coupled with viable nerves serving selected teeth of the subject. The radio frequency detector 20 includes a suitable tuned antenna tank circuit 22 and a coil designated $L_2$, connected to the low side of the antenna tank circuit, and the amplifier first stage. The detector, which may be of conventional circuit design, has its output connected to the amplifier 21, which also may be of conventonal circuit design, having an output transformer designated $L_1$.

One terminal 23 of the amplifier output transformer $L_1$ is capacitively coupled to viable nerves of a tooth 24 of the subject, by means of a cup-shaped conductive cap 25, advantageously formed of gold. The cap 25 advantageously is applied by conventional dental techniques, after first denuding the upper portion of the tooth of its original protective enamel, the cap being lined with a suitable dielectric paste, to establish a desired high impedance coupling between the conductive metal of the cap and the free nerve endings of the tooth. The other terminal 26 of the output transformer is suitably grounded to the tissue of the body, typically on the gum of the subject. To provide the necessary feedback coupling, in the system of FIG. 2, a second viable tooth of the subject is connected between the coil $L_2$ and the tank circuit 22 of the radio frequency detector 20. Advantageously, the connection is established through a cup-shaped metal cap 27 applied to a previously denuded tooth 28 containing viable nerves and arranged to have a high impedance coupling with the tooth through a dielectric paste material lining the inside of the cap.

As indicated in FIG. 2, a high impedance capacitive coupling, designated $C_3$, is formed between the respective teeth 24, 28 through the gum and other tissues of the subject such that, theoretically, a capacitively coupled feedback circuit to the detector 20 would be possible without the use of the cup-shaped cap 27, forming a predetermined capacitance $C_2$. However, since the coupling capacitance $C_3$ may vary from individual to individual, the additional capacitance $C_2$ is desired to accommodate a desired regulation of the total capacitance.

The system of FIG. 2 is utilized in conjunction with a transmitter 29, which has a microphone element 30, adapted to receive audible sounds, and suitable conventional circuit facilities to convert the audible sounds into radiated radio frequency energy. The transmitter advantageously is placed on or about the body of the subject, to receive sounds directed at the subject and broadcast them to the radio frequency detector 20 concealed within the oral cavity of the subject, the antenna tank circuit 22 being sharply tuned to the carrier frequency to the transmitter 29, which may be on the order of 4 mc., for example.

In the operation of the system of FIG. 2, the high frequency signal picked up by the detector circuit 20 is properly amplified in the amplifier 21 and impressed upon the viable nerves of the subject through the high impedance capacitive coupling into the tooth 24. The high frequency carrier signal imparted to the nerves through the tooth 24 is transmitted through the body capacitance $C_3$ and the coupling capacitor cup 27 back to the detector circuit 20 and the amplifier 21, for reamplification to produce the desired high level of operating voltage. In the system of FIG. 2, the entire intra-oral circuit advantageously is of a highly miniaturized or "micro-miniaturized" type, being suitably encapsulated and advantageously mounted in a space provided by the removal of one or more teeth of the subject.

A system of the type shown in FIG. 2 may, of course, be adapted for longer range transmission of radio frequency signals, either by the use of higher power transmitter units, such as the unit 29, located at a remote position, or through the use of a suitable transceiver unit, in place of the unit 29, for receiving radio signals from a remote source and retransmitting the information, usually on a different carrier frequency, to the detector unit 20.

In any of the various systems incorporating the principles of the invention, significant improvement is realized in the ability of the subject to hear and discriminate sound sensations derived through electrical stimulation. Thus, whereas the upper limit of sound perception either by acoustical stimulation or by electrical stimulation in accordance with the procedures known prior to our invention appears to be about 12 to 13 kc., test subjects have been able to perceive with clarity sounds up to as high as 20 kc. Moreover, we are not aware that 20 kc. represents an upper limit of sound perception utilizing the system of the invention, since improved signal generating circuitry, perhaps less subject to the generation of undesirable harmonics, may enable the subject to detect tones of still higher frequencies.

Key factors in the system of the invention are the use of a high frequency, audio modulated carrier signal, the provision of high impedance couplings, and the use of positive feedback of the high frequency signal to obtain high signal voltage. The feedback coupling apparently may be derived from various places on the body of the subject, although the input coupling should be made with nerves of the facial system of the subject, particularly in the areas of the neck, face and scalp, innervated by the trigeminal, facial and cervical nerves.

In the illustrated system of FIG. 1, the desired high impedance coupling to the facial system nerves is achieved by covering a conductive plate electrode with a .25 mil Mylar film, having a volume resistance on the order of $1 \times 10^{12}$ ohms. In the system of FIG. 2, the high impedance coupling is obtained through the use of cup-shaped conductive dental caps, advantageously lined internally with a dielectric paste.

It should be understood that the specific forms of the new hearing system illustrated herein are intended to be representative only, since the circuit may take a variety of specific forms, each utilizing the basic principle of providing positive feedback of a high frequency signal, through high impedance couplings. Accordingly, reference should be made to the following appended claims in determining the full scope of the invention.

We claim:
1. A system for electrically stimulating hearing in a human subject, which comprises
   (a) a signal source of audio modulated electrical signals including an amplification stage,
   (b) means adapted to be connected to viable nerves of the facial nerve system of a subject to effect a high impedance capacitive coupling between said signal source and said facial system of the subject, and
   (c) means adapted to effect a high impedance capacitive feedback coupling between the body of the subject and said signal source on the input side of said amplification stage.
2. The system of claim 1, in which said source of modulated electrical signals comprises
   (a) a microphone adapted to be positioned in proximity to the body of the subject for receiving audible sounds,
   (b) a radio frequency transmitter associated with said microphone for transmitting audio modulated signals corresponding to said audible sounds, and
   (c) a radio frequency receiver adapted to be positioned in the oral cavity of the subject and coupled with viable nerves of the teeth of the subject.
3. The system of claim 2, in which
   (a) said radio frequency receiver includes an amplification stage, and
   (b) said feedback coupling comprises means adapted to couple the body of the subject to said radio frequency receiver on the input side of said amplification stage.
4. The system of claim 1, in which
   (a) one of said means adapted to effect high impedance capacitive couplings comprises a cup-shaped dental cap of conductive material adapted to be secured over a denuded first viable tooth of the subject.
5. The system of claim 4, in which
   (a) a second cup-shaped dental cap is secured over said second viable tooth, and
   (b) conductor means are connected between said dental caps and said signal source on opposite sides of said amplification stage.
6. A system for electrically stimulating hearing in a human subject, which comprises
   (a) a source of audio modulated electrical signals, including means for generating a radio frequency carrier signal,
   (b) means for applying said carrier signal to the body of the subject, including means adapted to be connected to said body to effect a high impedance capacitance coupling of said source to viable nerves of the facial system of the subject, and
   (c) means adapted to effect a high impedance capacitive feedback coupling between the body of the subject and said signal source,
   (d) said means adapted to effect a feedback coupling being operative to transmit said carrier signal from the body of the subject to said signal source.
7. The system of claim 6, in which said signal source includes
   (a) a radio frequency transmitter, and
   (b) a radio frequency receiver tuned to said transmitter,
   (c) said receiver adapted to be coupled to said viable nerves,
   (d) one of said receiver and transmitter including a signal amplification stage, and
   (e) said means adapted to effect a feedback coupling is operative to transmit said carrier signal to said signal source on the input side of said amplification stage.

References Cited by the Examiner
UNITED STATES PATENTS

| | | | |
|---|---|---|---|
| 2,995,633 | 8/1961 | Puharich et al. | 128—1 |
| 3,156,787 | 11/1964 | Puharich et al. | 128—1 |
| 3,170,993 | 2/1965 | Puharich et al. | 179—107 |
| 3,211,832 | 10/1965 | Putzrath. | |

RICHARD A. GAUDET, *Primary Examiner.*

SIMON BRODER, *Examiner.*